United States Patent
Mody et al.

(10) Patent No.: US 7,269,127 B2
(45) Date of Patent: Sep. 11, 2007

(54) PREAMBLE STRUCTURES FOR SINGLE-INPUT, SINGLE-OUTPUT (SISO) AND MULTI-INPUT, MULTI-OUTPUT (MIMO) COMMUNICATION SYSTEMS

(75) Inventors: Apurva N. Mody, Atlanta, GA (US); Gordon L. Stuber, Atlanta, GA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 970 days.

(21) Appl. No.: 10/264,546

(22) Filed: Oct. 4, 2002

(65) Prior Publication Data

US 2003/0072452 A1    Apr. 17, 2003

Related U.S. Application Data

(60) Provisional application No. 60/327,145, filed on Oct. 4, 2001.

(51) Int. Cl.
*H04J 11/00* (2006.01)
(52) U.S. Cl. .................. 370/210; 370/430; 370/482; 375/144
(58) Field of Classification Search ............... 370/430, 370/480–482, 208, 206, 330, 210, 329, 512, 370/513; 342/375, 383; 375/146, 260, 355, 375/267, 144, 148
See application file for complete search history.

(56) References Cited

U.S. PATENT DOCUMENTS

| | | | |
|---|---|---|---|
| 5,732,113 A | 3/1998 | Schmidl et al. | 375/355 |
| 6,088,408 A | 7/2000 | Calderbank et al. | 375/347 |
| 6,115,427 A | 9/2000 | Calderbank et al. | 375/267 |
| 6,125,149 A | 9/2000 | Jafarkhani et al. | 375/262 |
| 6,185,258 B1 | 2/2001 | Alamouti et al. | 375/260 |
| 6,188,736 B1 | 2/2001 | Lo et al. | 375/347 |
| 2001/0031019 A1 | 10/2001 | Jafarkhani et al. | 375/267 |
| 2001/0050964 A1 | 12/2001 | Foschini et al. | 375/267 |
| 2001/0053143 A1 | 12/2001 | Li et al. | 370/344 |
| 2002/0041635 A1 | 4/2002 | Ma et al. | 375/267 |

(Continued)

OTHER PUBLICATIONS

Siavash M. Alamouti, "A Simple Transmit Diversity Technique for Wireless Communications," IEEE Journal on Select Areas in Communications, Oct. 1998, pp. 1451-1458, vol. 16, No. 8.

(Continued)

*Primary Examiner*—John Pezzlo
(74) *Attorney, Agent, or Firm*—Thomas, Kayden, Horstemeyer & Risley LLP; Daniel J. Long

(57) ABSTRACT

A communication system is provided herein for transmitting frames across a channel. The frames may be transmitted in single-input, single-output (SISO) and/or multi-input, multi-output (MIMO) communication systems. One such frame includes at least one training symbol, each having a cyclic prefix and a training block. The time length $N_I$ of the training block is equal to an integer fraction I of the time length of a data block, i.e., $N_I = N/I$. Furthermore, the time length G of the cyclic prefix is an integer fraction of the time length $N_I$. For example, G may be equal to $N_I/4$ or 25% of $N_I$. The training symbols provide coarse and fine time synchronization, coarse and fine frequency synchronization, channel estimation, and noise variance estimation.

25 Claims, 7 Drawing Sheets

U.S. PATENT DOCUMENTS

| | | | |
|---|---|---|---|
| 2002/0122381 A1* | 9/2002 | Wu et al. | 370/208 |
| 2002/0122382 A1* | 9/2002 | Ma et al. | 370/208 |
| 2002/0181390 A1 | 12/2002 | Mody et al. | 370/208 |
| 2002/0181509 A1 | 12/2002 | Mody et al. | 370/480 |
| 2003/0043887 A1* | 3/2003 | Hudson | 375/144 |

OTHER PUBLICATIONS

Vahid Tarokh, Hamid Jafarkhani, A. R. Calderbank, "Space-Time Block Codes from Orthogonal Designs," IEEE Transaction on Information Theory, Jul. 1999, pp. 1456-1467, vol. 45, No. 5.

Vahid Tarokh, Hamid Jafarkhani, A. R. Calderbank, "Space-Time Block Coding for Wireless Communications: Performance Results," IEEE Journal on Selected Areas in Communications, Mar. 1999, pp. 451-460, vol. 17, No. 3.

Ye (Geoffrey) Li, Nambirajan Seshadri, Sirikiat Ariyavisitakul, "Channel Estimation for OFDM Systems With Transmitter Diversity in Mobile Wireless Channels," IEEE Journal on Selected Areas in Communications, Mar. 1999, pp. 461-471, vol. 17, No. 3.

Apurva N. Mody, Gordon L. Stuber, "Synchronization for MIMO OFDM Systems," 2001, pp. 509-513, vol. 1, Proceedings of GLOBECOM 2001, San Antonio.

Apurva N. Mody, Gordon L. Stuber, "Parameter Estimation for OFDM With Transmit Receive Diversity," 2001, Proceedings of VTC Rhodes, Greece.

Apurva N. Mody, Gordon L. Stuber, "Efficient Training and Synchronization Sequence Structures for MIMO OFDM," 2001, Proceedings of 6$^{th}$ OFDM Workshop 2001, Paper 16, Hamburg, Germany.

Timothy M. Schmidl, Donald C. Cox, "Robust Frequency and Timing Synchronization for ODFM," IEEE Transactions on Communications, Dec. 1997, pp. 1613-1621, vol. 45, No. 12.

Apurva N. Mody, Gordon L. Stuber, "Receiver Implementation for a MIMO OFDM System," Nov. 2002, Proceedings of GLOBECOM 2002, Taipei, Taiwan.

* cited by examiner

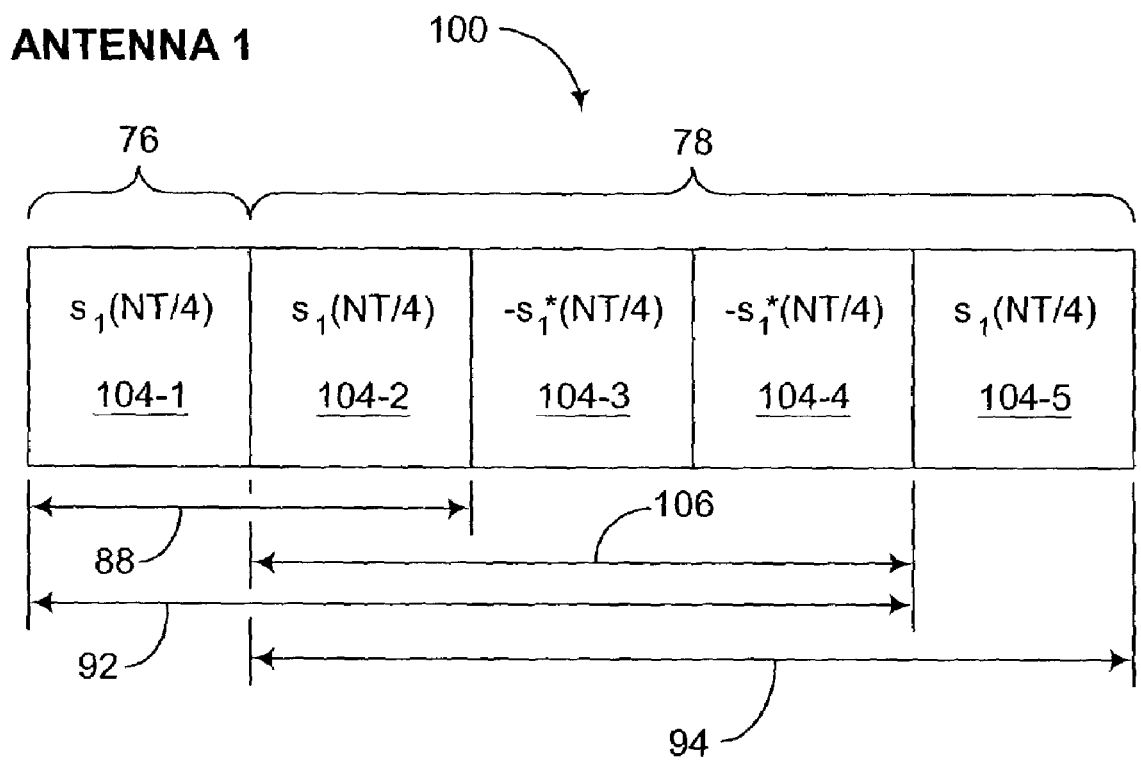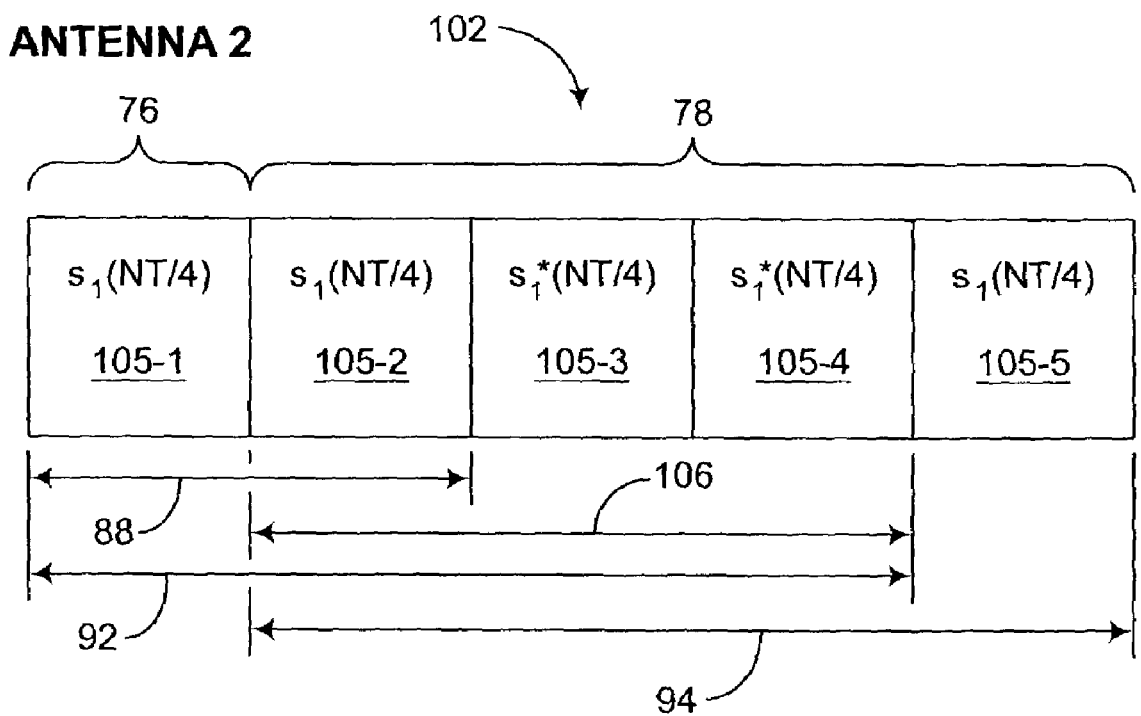
FIG. 9

PREAMBLE STRUCTURES FOR SINGLE-INPUT, SINGLE-OUTPUT (SISO) AND MULTI-INPUT, MULTI-OUTPUT (MIMO) COMMUNICATION SYSTEMS

CROSS-REFERENCE TO RELATED APPLICATIONS

This application claims priority to co-pending U.S. provisional application entitled "Preamble Structures for SISO and MIMO OFDM Systems," having Ser. No. 60/327,145, filed on Oct. 4, 2001, which is entirely incorporated herein by reference.

This application is related to U.S. provisional application entitled "Efficient Training and Synchronization Sequence Structures for MIMO OFDM," having Ser. No. 60/322,786, filed Sep. 17, 2001, which is entirely incorporated herein by reference.

TECHNICAL FIELD OF THE INVENTION

The present invention is generally related to communication systems and, more particularly, to single-input, single-output (SISO) and multi-input, multi-output (MIMO) communication systems.

BACKGROUND OF THE INVENTION

Significant developments in communications have been made by the introduction of technologies that increase system operating efficiency (i.e., system "throughput"). One example of these technologies is the use of two or more transmit antennas and two or more receive antennas (i.e., multiple antennas) in a wireless communication system. Such systems are typically referred to as multi-input, multi-output (MIMO) communication systems. In contrast, traditional wireless communication systems typically employ one transmit antenna and one receive antenna, and such systems are referred to accordingly as single-input, single-output (SISO) systems.

In addition, traditional communication systems typically use one of two types of signal carrier systems. One such system uses only one carrier for the transmission of information and is known as a single carrier (SC) system. A system that uses multiple carriers to transmit information in parallel is known as a multi-carrier (MC) system. MC systems divide the existing bandwidth into a number of sub-channel bandwidths and each bandwidth is modulated individually by a respective sub-carrier. The method of dividing the bandwidth into sub-channel bandwidths is referred to as frequency division multiplexing (FDM). Therefore, either SISO or MIMO communications may use a SC or an MC signal carrier system.

In a MIMO communication system, signals are typically transmitted over a common path (i.e., channel) by multiple antennas. The signals are typically pre-processed to avoid interference from other signals in the common channel. There are several techniques that may be used to pre-process the signals in this regard, and some of these techniques may be combined to further improve system throughput. One such technique, known as space-time processing (STP), processes and combines "preamble structures" and "data structures" into groups referred to herein as "frame structures." Wireless communication systems typically transmit data, or information (e.g., voice, video, audio, text, etc.), as formatted data symbols (or information symbols), which are typically organized into groups referred to herein as data structures. The preamble structure contains an overhead for providing synchronization and parameter estimation, allowing a receiver to decode signals received from a transmitter. In a MIMO communication system, multiple frame structures are transmitted by a corresponding number of transmit antennas. The combination of the multiple frame structures is generally referred to space-time signal structures. Each frame structure generally includes a preamble structure followed by a data structure.

Training symbols are typically added as prefixes to the data structures (e.g., at the beginning of frame structure) to enable training (i.e., time and frequency synchronization) between the transmitter and receiver of a MIMO communication system. These training symbols can be referred to as preambles and are part of the preamble structures. Space-time signal structures are constructed using STP for training symbols and data symbols individually. Furthermore, pilot structures (or pilots) are symbols that are also constructed by STP and have the same structure as preambles. However, instead of being placed as a prefix to the data structure, the pilot structures are periodically arranged within groups of data symbols. Certain properties incorporated into space-time signal structures make it possible to recover the data structures by post-processing the space-time signal structures with a receiver. Moreover, the formation and processing of space-time signal structures in a wireless communication system may provide increased strength (i.e., gain) in the recovered signal, which typically enhances the performance of the communication system.

Another technique that may be used to pre-process signals in a MIMO communication system is FDM as mentioned earlier. FDM involves dividing the frequency spectrum of a wireless communication system into sub-channels and transmitting modulated data, or information (i.e., formatted signals for voice, video, audio, text, etc.), over these sub-channels at multiple signal carrier frequencies ("sub-carrier frequencies").

Communication systems involving orthogonal frequency division multiplexing (OFDM) have emerged as a popular form of FDM in which the sub-carrier frequencies are spaced apart by precise frequency differences. The application of the OFDM technology in a SISO communication system (i.e., a SISO OFDM system) provides the capability, among others, to efficiently transmit and receive relatively large amounts of information. The application of OFDM in a MIMO communication system (i.e., a MIMO OFDM system) increases the system's capacity to transmit and receive information using approximately the same amount of bandwidth (i.e., transmission line capacity) as used in a SISO OFDM systems. A MIMO OFDM communication system also offers improved performance to overcome some of the difficulties experienced in other FDM communication systems, such as performance degradation due to multiple versions of a transmitted signal being received over various transmission paths (i.e., multi-path channel interference).

In SISO and MIMO wireless communication systems, synchronization of data symbols is typically required in both the time domain and the frequency domain. Estimation of parameters such as noise variance and other channel parameters is also typically required. Thus, an efficient preamble structure for use in wireless communication systems should provide both synchronization and parameter estimation. Furthermore, an efficient preamble structure should possess a low peak-to-average power ratio (PAPR) (i.e., at or approaching unity) to facilitate efficient system operation.

In their application to SISO and MIMO communication systems, however, various shortcomings have been identified in existing preamble structures. For example, the IEEE Standard 802.11a preamble structure includes a short sequence, which provides time synchronization and coarse frequency offset estimation, followed by a long sequence, which provides fine frequency and channel estimation. Although this preamble has application to SISO communication systems, it is not directly applicable to a MIMO communication system to provide the above mentioned functions, without the need for significant modifications. Moreover, there is considerable redundancy in the IEEE Standard 802.11a preamble structure, which reduces the system throughput and hence the system efficiency.

Therefore, there is a need for an efficient preamble structure that provides time and frequency synchronization, estimation of parameters such as noise variance and channel parameters, and low PAPR when used with SISO and MIMO communication systems.

SUMMARY OF THE INVENTION

The present invention provides a system for providing efficient preamble structures for use in single-input, single-output (SISO) and multi-input, multi-output (MIMO) communication systems. Briefly described, one embodiment of the present invention, among others, includes providing a communication system for transmitting space-time signal structures across a channel. The space-time signal structures may be transmitted using a SISO communication system and/or a MIMO communication system. One such space-time signal structure includes at least one training symbol, each training symbol having a cyclic prefix and a training block. The length of $N_I$ samples of the training block is equal to a fraction of the length of N samples of a data block such that $N_I=N/I$, where I is a positive integer. Furthermore, the length of G samples of the cyclic prefix is a fraction of the length $N_I$. For example, G may be equal to $N_I/4$, or 25% of $N_I$. The training symbols provide coarse and fine time synchronization, coarse and fine frequency synchronization, channel estimation, and noise variance estimation.

The present invention can also be viewed as providing a method for providing efficient preamble structures for SISO and MIMO communication systems. In this regard, one embodiment of such a method, among others, can be broadly summarized by the following: providing a space-time signal structure having at least one training symbol, each training symbol having a cyclic prefix and a training block. The length of $N_I$ samples of the training block is equal to a fraction of the length of N samples of a data block, i.e., $N_I=N/I$. Furthermore, the length of G samples of the cyclic prefix is a fraction of the length of $N_I$. For example, G may be equal to $N_I/4$, or 25% of $N_I$. The training symbols provide coarse and fine time synchronization, coarse and fine frequency synchronization, channel estimation, and noise variance estimation.

Other systems, methods, features and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. Moreover, in the drawings, like reference numerals designate corresponding parts throughout the several views.

FIG. 9 illustrates an embodiment of a preamble structure that may be implemented in a MIMO communication system, e.g., the system depicted in FIG. 1.

DETAILED DESCRIPTION

The invention now will be described more fully with reference to the accompanying drawings. The invention may, however, be embodied in many different forms and should not be construed as limited to the embodiments set forth herein. Rather, these embodiments are intended to convey the scope of the invention to those skilled in the art. Furthermore, all "examples" given herein are intended to be non-limiting.

Figure 1:
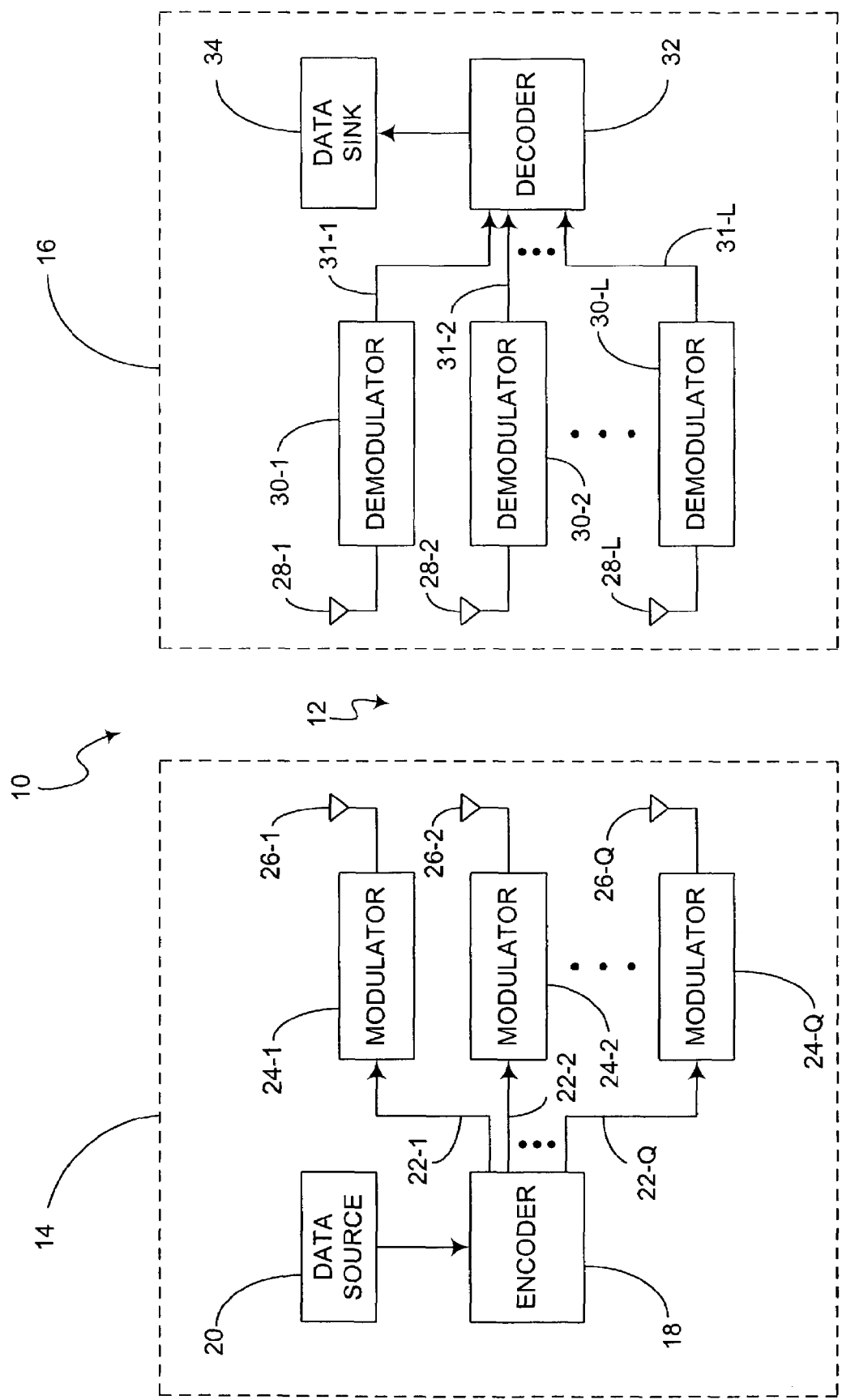
FIG. 1 is a block diagram of an exemplary multi-input, multi-output (MIMO) communication system.

FIG. 1 shows a block diagram of an exemplary multi-input, multi-output (MIMO) communication system 10. The exemplary MIMO communication system 10 and its subcomponents will be described below to facilitate the description of the present invention. In that regard, the exemplary MIMO communication system 10 may be implemented as a wireless system for the transmission and reception of data across a wireless channel 12. For example, the MIMO communication system 10 may be implemented as part of a wireless local area network (LAN) or metropolitan area network (MAN) system, a cellular telephone system, or another type of radio or microwave frequency system incorporating one-way or two-way communications over a range of distances.

The MIMO communication system 10 may transmit and receive signals at various frequencies. For example, the MIMO communication system 10 may transmit and receive signals in a frequency range from 2 to 11 GHz, such as in the unlicensed 5.8 GHz band, using a bandwidth of about 3 to 6 MHz. Further, the MIMO communication system 10 may employ various signal modulation and demodulation techniques, such as single-carrier frequency domain equalization (SCFDE) or orthogonal frequency division multiplexing (OFDM), for example. However, throughout this description, references will be made with respect to a MIMO OFDM communication system merely to facilitate the description of the invention.

The MIMO communication system 10 may also be implemented as part of a communication system (not shown) that includes an array of sub-channel communication links, which convey one or more signals transmitted by one or more transmitting elements to one or more receiving elements. The sub-channel communication links may include wires (e.g., in a wiring harness) or other forms of transmission medium that span between a data source and a receiver within the communication system.

The MIMO communication system 10 includes a transmitter 14 and a receiver 16. The transmitter 14 transmits signals across the channel 12 to the receiver 16. As depicted in FIG. 1, the transmitter 14 typically includes several components. In this regard, the transmitter 14 includes an encoder 18. The encoder 18 typically encodes data and/or other types of signals received, for example, from a data source 20. Such signals may alternatively be referred to collectively as "data," "signals," or "data signals." The data source 20 may be a device, system, etc. that outputs such signals. The encoder 18 may also perform functions such as employing a channel code on data for transmission and forming sequence structures by STP techniques. Further, the encoder 18 may separate the signals from data source 20 onto one or more signal paths, which are referred to as transmit diversity branches (TDBs) 22-1, 22-2, . . . , 22-Q, where Q is the number of transmit antennas from which the signals are transmitted. The encoder 18 typically facilitates the transmission of signals across the channel 12 by bundling the signals into groups, which are typically referred to as space-time signal structures. Details of an exemplary space-time signal structure, with respect to the present invention, is discussed below with respect to FIG. 6.

Further shown in FIG. 1, the transmitter 14 also includes one or more modulators 24-1, 24-2, . . . , 24-Q that are configured to modulate signals for transmission over the channel 12. In this regard, the modulators 24 may employ various modulation techniques, such as SCFDE or OFDM. The modulators 24 are typically connected to the encoder 18 by the TDBs 22. The transmitter 14 also includes one or more transmit antennas 26-1, 26-2, . . . , 26-Q connected respectively to the one or more modulators 24-1, 24-2, . . . , 24-Q. Thus, each TDB 22 directs signals from the encoder 18 to a corresponding modulator 24, and the modulator 24 modulates the signals for transmission by a respective transmit antenna 26. An embodiment of a space-time signal structure transmitted by the transmitter 14 is described below with reference to FIG. 6.

As discussed above, the exemplary MIMO communication system 10, shown in FIG. 1, also includes a receiver 16. The receiver 16 also typically includes several components. The receiver includes one or more receive antennas 28-1, 28-2, . . . , 28-L, where L is the number of receive antennas used to receive the Q transmitted space-time signal structures. With Q transmit antennas 26 and L receive antennas 28, the MIMO communication system 10 can be referred to as a Q×L system. In a SISO communication system, the variables Q and L are both equal to one. In a MIMO system, Q and L are equal to a number greater than one and may be equal to each other or non-equal. For example, a 2×2 MIMO communication system comprises two transmit antennas, i.e., Q=2, and two receive antennas, i.e., L=2.

The receive antennas 28-1, 28-2, . . . , 28-L are connected to one or more demodulators 30-1, 30-2, . . . , 30-L, respectively. The receive antennas 28 typically receive modulated signals, i.e., space-time signal structures, that are transmitted across the channel 12 from the transmit antennas 26. The received signals are typically directed to the demodulators 30 from the respective receive antennas 28.

The demodulators 30 demodulate signals that are received by the respective receive antennas 28.

The receiver 16 also includes a decoder 32, which is connected to the demodulators 30-1, 30-2, . . . , 30-L via corresponding lines 31-1, 31-2, . . . , 31-L. The decoder 32 typically combines and decodes the demodulated signals from the demodulators 30. In this regard, the decoder 32 typically recovers the original signals that were provided by the data source 20. As depicted in FIG. 1, the original signals recovered by the decoder 32 may be transmitted to a connected data sink 34, which may include one or more devices configured to utilize or process the recovered signals.

As discussed above, the transmitter 14 of the MIMO communication system 10 includes one or more modulators 24 that are connected to one or more transmit antennas 26, respectively. Further, the receiver 16 of the MIMO communication system 10 includes one or more demodulators 30 that are connected to one or more receive antennas 28, respectively. In this regard, the number of modulators 24 and respective transmit antennas 26 that are implemented in the transmitter 14 may be represented by a first variable, "Q." Similarly, the number of demodulators 30 and respective receive antennas 28 that are implemented in the receiver 16 may be represented by a second variable, "L." In the exemplary MIMO communication system 10, the number Q of modulators 24 and respective transmit antennas 26 may be equivalent or non-equivalent to the number L of demodulators 30 and respective receive antennas 28. In this regard, the MIMO communication system 10 may be said to have "Q×L" transmit-receive diversity.

Figure 2:
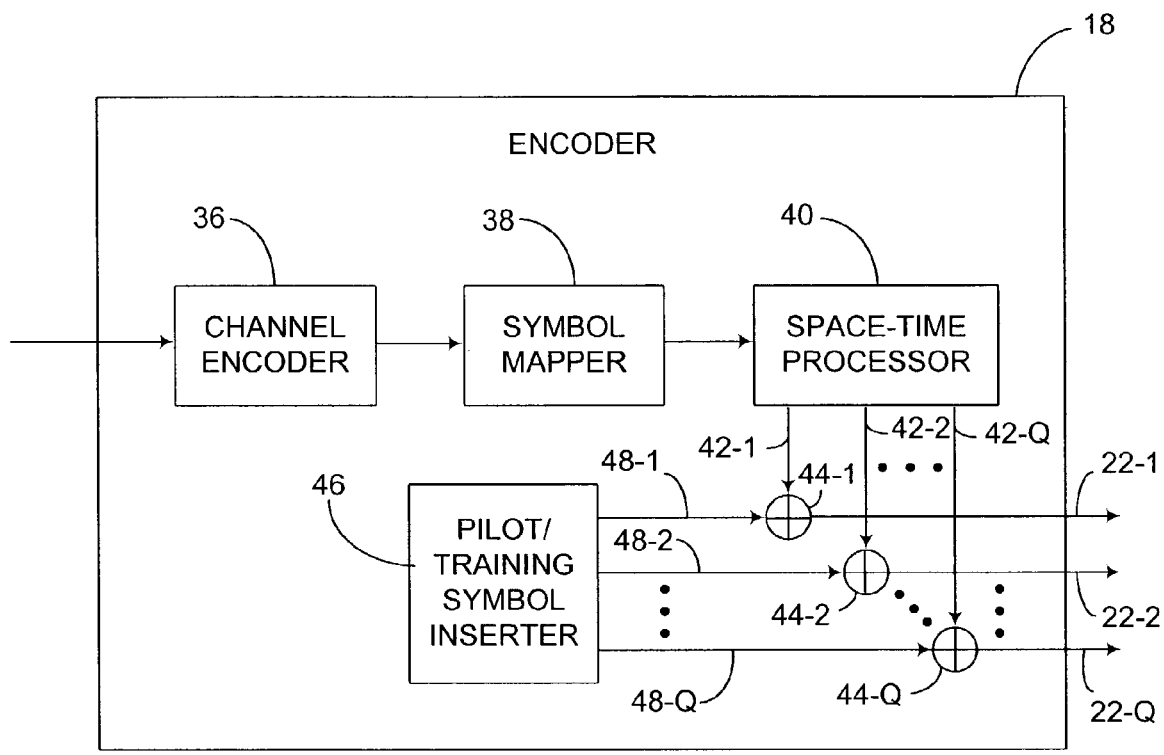
FIG. 2 is a block diagram of an exemplary encoder with respect to the communication system depicted in FIG. 1.

FIG. 2 is a block diagram of an exemplary encoder 18 of the MIMO communication system 10 depicted in FIG. 1. The elements of the encoder 18 shown in FIG. 2 will be described below with respect to several elements that were described above for FIG. 1. The exemplary encoder 18 includes a channel encoder 36. The channel encoder 36 typically converts data and/or other types of signals to channel encoded versions of the signals, which may also be referred to collectively as "channel encoded data" or "channel encoded signals." These signals may be received by the channel encoder 36 from a data source 20, for example. The channel encoder 36 is typically configured to encode signals using an encoding scheme that can be recognized and decoded by the decoder 32 of the receiver 16. In the process of encoding signals, the channel encoder 36 typically adds parity to the signals so that the decoder 32 can detect errors in the received channel encoded signals, which may occur, for example, due to environmental conditions that affect the channel 12 or noise inadvertently injected into the signals by the transmitter 14 and/or receiver 16.

The exemplary encoder 18 depicted in FIG. 2 also includes a symbol mapper 38, which receives channel encoded signals from the channel encoder 36. The symbol mapper 38 is typically configured to map channel encoded signals into data blocks. This mapping may be done by grouping a predetermined number of bits of the data so that each group of bits constitutes a specific data block that is selected from a pre-determined symbol alphabet. In this regard, a symbol alphabet typically includes a finite set of values. For example, a symbol alphabet of a binary phase shift keying (BPSK) system typically comprises the values +1 and −1, and a symbol alphabet for a quadrature phase shift keying (QPSK) system typically comprises the values 1+j, −1+j, 1−j, and −1−j. The symbol mapper 38 is also typically configured to structure a stream of data blocks into data structures, which will be discussed further below.

The exemplary encoder 18 also includes a space-time processor 40. The space-time processor 40 is typically configured to encode a stream of data blocks, received from the symbol mapper 38, through space-time processing to form the data block designated for different TDBs 22 such that the processed data blocks have properties that enhance the performance of the MIMO communication systems 10. The encoded data blocks are output from the space-time processor 40 over Q lines 42-1, 42-2, . . . , 42-Q, where Q represents the number of modulators 24 and respective transmit antennas 26 of the transmitter 14, as discussed above.

As further illustrated in FIG. 2, the Q lines 42-1, 42-2, . . . , 42-Q from the space-time processor 40 input respectively to Q adders 44-1, 44-2, . . . , 44-Q. The encoder 18 also includes a pilot/training symbol inserter 46, which also has Q output lines 48-1, 48-2, . . . , 48-Q that input respectively to the Q adders 44-1, 44-2, . . . , 44-Q. The Q adders 44-1, 44-2, . . . , 44-Q combine, or mix, the inputs and provide an output to the Q TDBs 22-1, 22-2, . . . , 22-Q, which input respectively to the Q modulators 24-1, 24-2, . . . 24-Q shown in FIG. 1. The pilot/training symbol inserter 46 typically provides pilot blocks and training blocks that are inserted into (or combined with) the data blocks by the adders 44.

The term pilot blocks, as used in this description, refers to symbols provided by the pilot/training symbol inserter 46, which are inserted periodically into the data blocks. Typically, pilot symbols may be inserted at any point in the data blocks. The term training blocks refers to one or more continuous sections of symbols provided by the pilot/training symbol inserter 46. Training blocks are preferably inserted into preamble structures at the beginning of the frame structures and transmitted once per frame structure. However, training blocks may also be inserted in other parts of the signal structures, such as the middle or end of the frame structures. Preambles (or preamble structures) are symbol structures formed of training blocks inserted at the beginning of the frame.

Pilot blocks are typically transmitted with data blocks to calibrate (i.e., synchronize) the receiver 16 to the transmitter 14 on a small scale. This calibration, or synchronization, accounts for the time varying nature of the channel 12, for example. Training symbols, however, are typically used to periodically calibrate the receiver 16 to the transmitter 14. The training symbols may be unique for each sub-channel. Moreover, different sets of training symbols and/or pilot blocks may be provided by the pilot/training symbol inserter 46, depending on the operating criteria of the communication system 10, which may be determined by the user.

Figure 3:
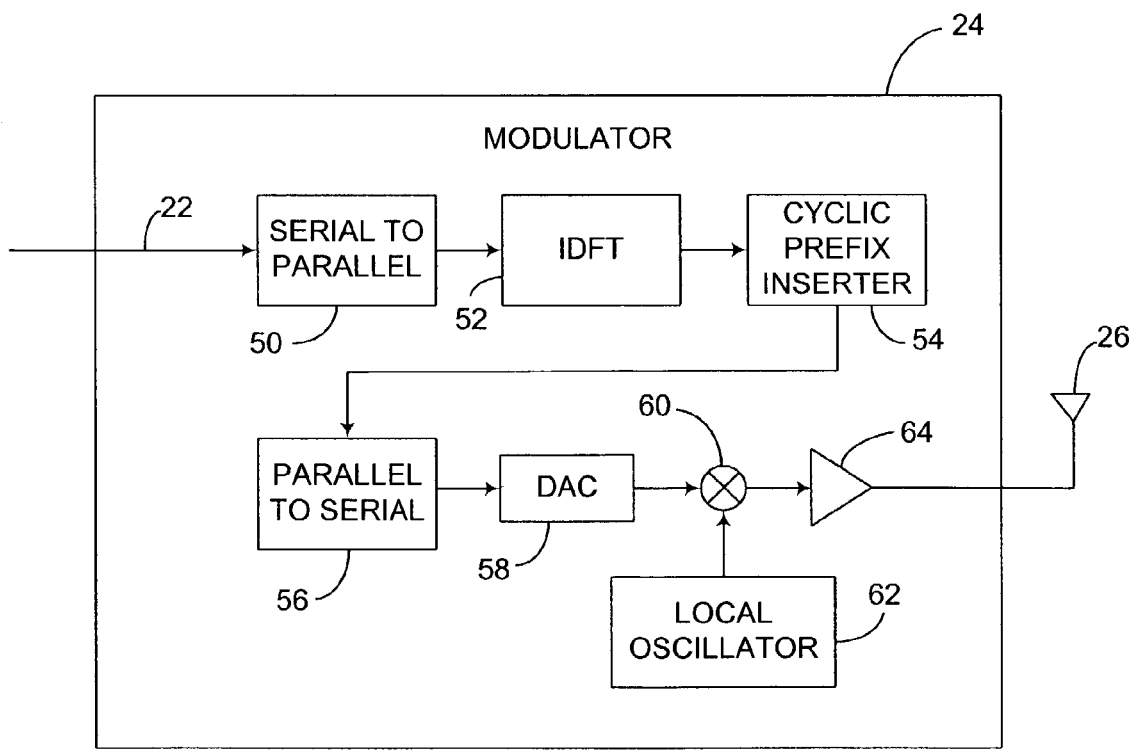
FIG. 3 is a block diagram of an exemplary modulator with respect to the communication system depicted in FIG. 1.

FIG. 3 is a block diagram of an exemplary modulator 24 from one of the modulators 24-1, 24-2, . . . , 24-Q of the communication system of FIG. 1. The exemplary modulator 24 may be configured to modulate signals by various techniques, such as SCFDE or OFDM. The input to the modulator 24 is from a corresponding TDB 22, which was discussed above. As shown, the TDB 22 couples to a serial-to-parallel converter 50, which is one of several components of the modulator 24. The serial-to-parallel converter 50 converts the training blocks and data blocks from a serial format to a parallel format for further processing by other components of the modulator 24. Typically, the serial-to-parallel converter 50 converts a number of samples "N" of each of the data blocks from a serial format to a parallel format. The serial-to-parallel converter 50 also converts a number of samples "$N_T$" of each of the training blocks from serial samples to parallel samples.

The modulator 24 also includes an inverse discrete Fourier transform (IDFT) stage 52 that receives the parallel format of the training blocks and data blocks from the series-to-parallel converter 50. The IDFT stage 52 converts these blocks from the frequency domain to the time domain, as is known in the art. Typically, the IDFT stage 52 receives N samples for each data block and $N_T$ samples for each training block from the serial-to-parallel converter 50 and converts the samples in the frequency domain to N samples for each data block and $N_T$ samples for each training block in the time domain. The time domain samples from the IDFT stage 52 are input to a cyclic prefix inserter 54. The cyclic prefix inserter 54 inserts an additional number of samples "G" with each data block and training block to form data symbols and training symbols. The G samples are inserted into the data symbols and training symbols as guard intervals to reduce or eliminate inter-symbol interference (ISI) in the N or $N_T$ samples.

The modulator 24 also includes a parallel-to-serial converter 56, which converts the G+N or G+$N_T$ samples received from the cyclic prefix inserter 54 from a parallel format to a serial format for further processing by other components of the modulator 24. The modulator 24 further includes a digital-to-analog converter (DAC) 58. The DAC 58 converts the digital symbols to analog symbols and inputs the analog symbols to a mixer 60. A local oscillator 62 generates carrier signals, which are also input to the mixer 60. The mixer 60 mixes the analog symbols from the DAC 58 with the carrier signals from the local oscillator 62 to generate up-converted versions of the signals for transmission as radio-frequency (RF) signals. The mixer 60 inputs the up-converted signals to an amplifier 64 where the signals are amplified and then input to the transmit antenna 26, which transmits the signals across the channel 12.

Figure 4:
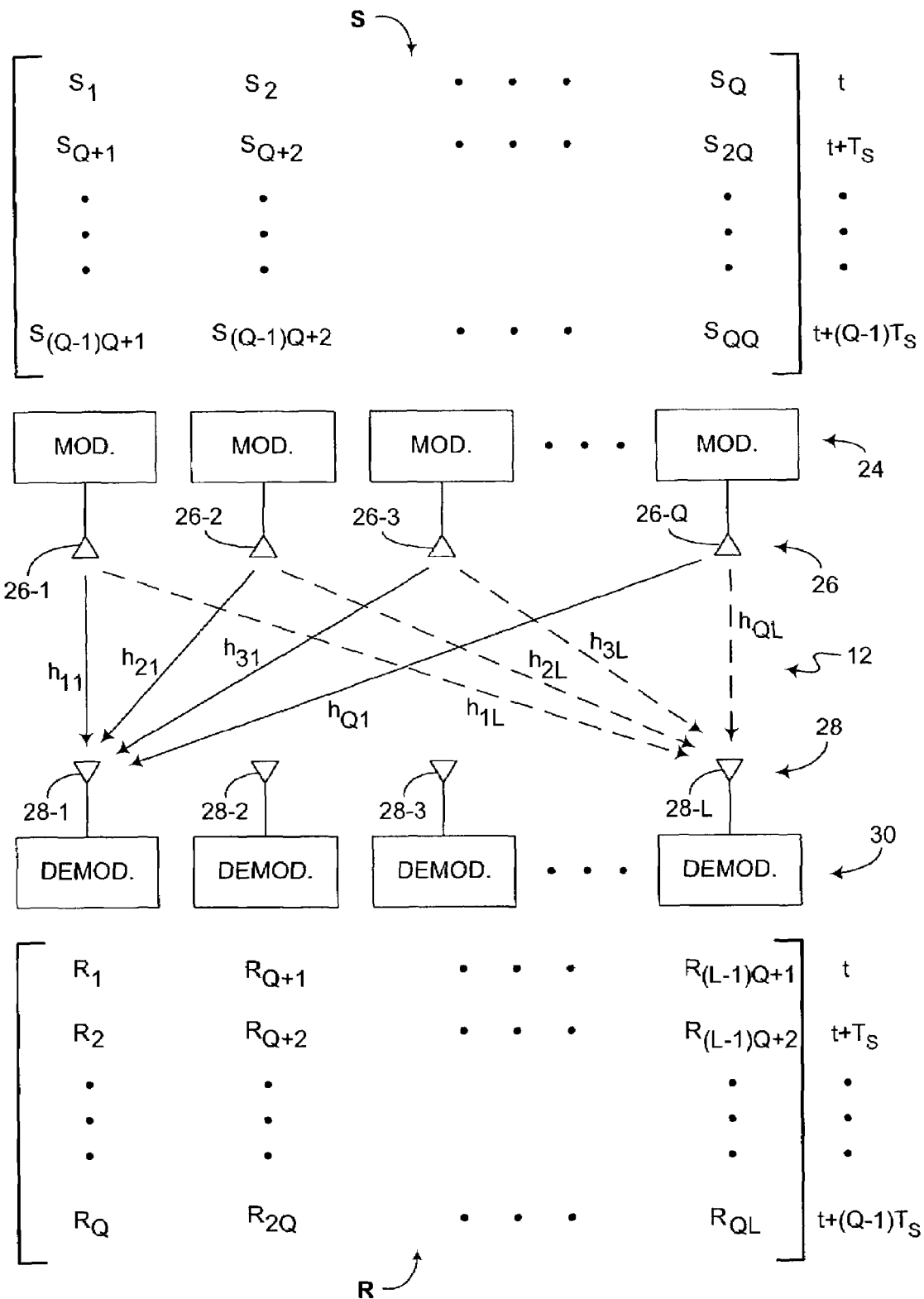
FIG. 4 is a diagram illustrating exemplary signal transmissions and associated signal sample matrices with respect to the communication system depicted in FIG. 1.

FIG. 4 is a schematic diagram illustrating exemplary signal transmissions and associated signal sample matrices with respect to the modulator/demodulator configuration of the MIMO communication system 10 of FIG. 1. As shown in FIG. 4, the configuration includes one or more modulators 24 and one or more demodulators 30. Each modulator 24 is connected to one or more respective transmit antennas 26, and each demodulator 30 is connected to one or more respective receive antennas 28, as discussed above with respect to FIG. 1. Also discussed above, the transmit antennas 26 are typically configured to transmit modulated signals across a channel 12, and the receive antennas 28 are typically configured to receive modulated signals via the channel 12. In this regard, exemplary signal transmissions are depicted in FIG. 4, which will be discussed further below.

Similar to the above discussion with respect to the MIMO communication system 10 of FIG. 1, the number of modulators 24 and respective transmit antennas 26 that are implemented in the modulator/demodulator configuration of FIG. 4 may be represented by the variable, "Q." Accordingly, the number of demodulators 30 and respective receive antennas 28 in the arrangement of FIG. 4 may be represented by the variable, "L." Thus the modulator/demodulator arrangement depicted in FIG. 4 may also be described as having "Q×L" transmit-receive diversity. Moreover, the variables, Q and L, may be equivalent or non-equivalent in various MIMO communication system configurations.

Exemplary signal transmissions from the Q transmit antennas 26 across the channel 12 to the L receive antennas 28 are depicted in FIG. 4. For example, the first receive antenna 28-1 receives each of the Q transmitted signals from the Q transmit antennas 26-1, 26-2, . . . , 26-Q. These Q transmitted signals are typically transmitted over sub-channels having an impulse response characterized by $h_{11}$, $h_{21}$, $h_{31}$, ..., $h_{Q1}$ that are transmitted from the $1^{st}$ to the $Q^{th}$ transmit antennas 26-1, 26-2, ..., 26-Q, respectively. In this regard, the term $h_{ij}$ (where i=1, 2, ..., Q and j=1, 2, ..., L) is used to refer to the impulse response, in the time domain, of the sub-channels between the $i^{th}$ transmit antenna 26 and the $j^{th}$ receive antenna 28. Thus, as a further example, the $L^{th}$ receive antenna 28-L receives each of the Q transmitted signals, over the sub-channels having impulse responses $h_{1L}$, $h_{2L}$, $h_{3L}$, ..., $h_{QL}$, from the $1^{st}$ to the $Q^{th}$ transmit antennas 26-1, 26-2, ..., 26-Q, respectively. Although, for simplicity, exemplary signal transmissions are depicted in FIG. 4 from the Q transmit antennas 26 to the $1^{st}$ and the $L^{th}$ receive antennas 28-1 and 28-L only. However, it should be understood that, in a typical MIMO communication system, all L receive antennas 28 receive the signal transmissions from the Q transmit antennas 26.

A transmit sample matrix S is illustrated in FIG. 4. The matrix S is associated with the signals that are modulated by the Q modulators 24 and transmitted over the channel 12 from the Q transmit antennas 26. In this regard, the sample matrix S may be associated with signals that are transmitted by the MIMO communication system 10. Thus, the elements of the transmit sample matrix S may represent Q space-time signal structures, which are simultaneously transmitted from the Q transmit antennas 26 during Q symbol periods ("$T_S$"). For example, the elements of the first row of the transmit sample matrix S may represent the frame structures $S_1$, $S_2$, ..., $S_Q$, which are transmitted from the $1^{st}$ through the $Q^{th}$ transmit antennas 26, respectively, at a first instantaneous time ("t"). Similarly, the elements of the second row of the transmit sample matrix S may represent the frame structures $S_{Q+1}$, $S_{Q+2}$, ..., $S_{2Q}$, which are transmitted from the $1^{st}$ through the $Q^{th}$ transmit antennas 26, respectively, at a second time ("$t+T_S$"). For the purpose of illustration, the transmission times, e.g., t, $t+T_S$, etc., are shown to the right of the transmit sample matrix S. The elements of the last row of the transmit sample matrix S may represent the final set of symbols, $S_{(Q-1)Q+1}$, $S_{(Q-1)Q+2}$, ..., $S_{QQ}$, which are transmitted from the $1^{st}$ through the $Q^{th}$ transmit antennas 26, respectively, at a final time ("$t+(Q-1)T_S$"). Additional transmission times may be needed if more frame structures are transmitted.

FIG. 4 also includes a receive sample matrix R, which is associated with the signals that are received over the channel 12 by the L receive antennas 28 and demodulated by the L demodulators 30. Similar to the elements of the transmit sample matrix S, the elements of the receive sample matrix R may represent L received space-time signal structures, which are simultaneously received by the L receive antennas 28 during Q or more symbol periods ("$T_S$"). For example, the elements of the first row of the receive sample matrix R may represent the symbols $R_1$, $R_{Q+1}$, ..., $R_{(L-1)Q+1}$, which are demodulated by the $1^{st}$ through the $L^{th}$ demodulators 30, respectively, at a first time ("t"). Similarly, the elements of the second row of the receive sample matrix R may represent the symbols $R_2$, $R_{Q+2}$, ..., $R_{(L-1)Q+2}$, which are demodulated by the $1^{st}$ through the $L^{th}$ demodulators 30, respectively, at a second time ("$t+T_S$"). The elements of the last row of the receive sample matrix R may represent the final set of symbols, $R_Q$, $R_{2Q}$, ..., $R_{QL}$, which are demodulated by the $1^{st}$ through the $L^{th}$ demodulators 30, respectively, at a final time ("$t+(Q-1)T_S$"). It is noted that although references are made to the same time instances (e.g., t, $t+T_S$, etc.) in the foregoing descriptions with respect to the transmit sample matrix S and the receive sample matrix R, there is typically a time delay between the transmission and reception of the space-time signal structures represented by these matrices.

In addition to the transmit sample matrix S and the receive sample matrix R, there are at least two other matrices that are relevant to represent the transmission and reception of signals in a MIMO communication system, such as the system depicted in FIG. 1. The channel matrix η typically includes elements that represent channel coefficients, which are determined based on characteristics of the channel 12. The channel matrix η typically has a dimension of Q×L. A noise matrix W typically includes elements that represent additive white Gaussian noise, which typically causes distortion and corruption of received signals that are represented, for example, by the receive sample matrix R. The noise matrix W typically has a dimension of Q×L.

The relationship between the receive sample matrix R, the transmit sample matrix S, the channel matrix η, and the noise matrix W can be expressed by the following equation:

$$R_{k,T \times L} = S_{k,T \times Q} \cdot \eta_{k,Q \times L} + W_{k,T \times L} \qquad \text{EQ. 1}$$

With respect to EQ. 1, k represents the sub-carrier or sub-channel of received demodulated signals and T represents a dimension variable that is typically equivalent to Q, although it may have other values. As discussed above, Q and L represent, respectively, the number of modulators 24 and respective transmit antennas 26 and the number of demodulators 30 and respective receive antennas 28 with respect to a typical MIMO communication system 10.

Figure 5:
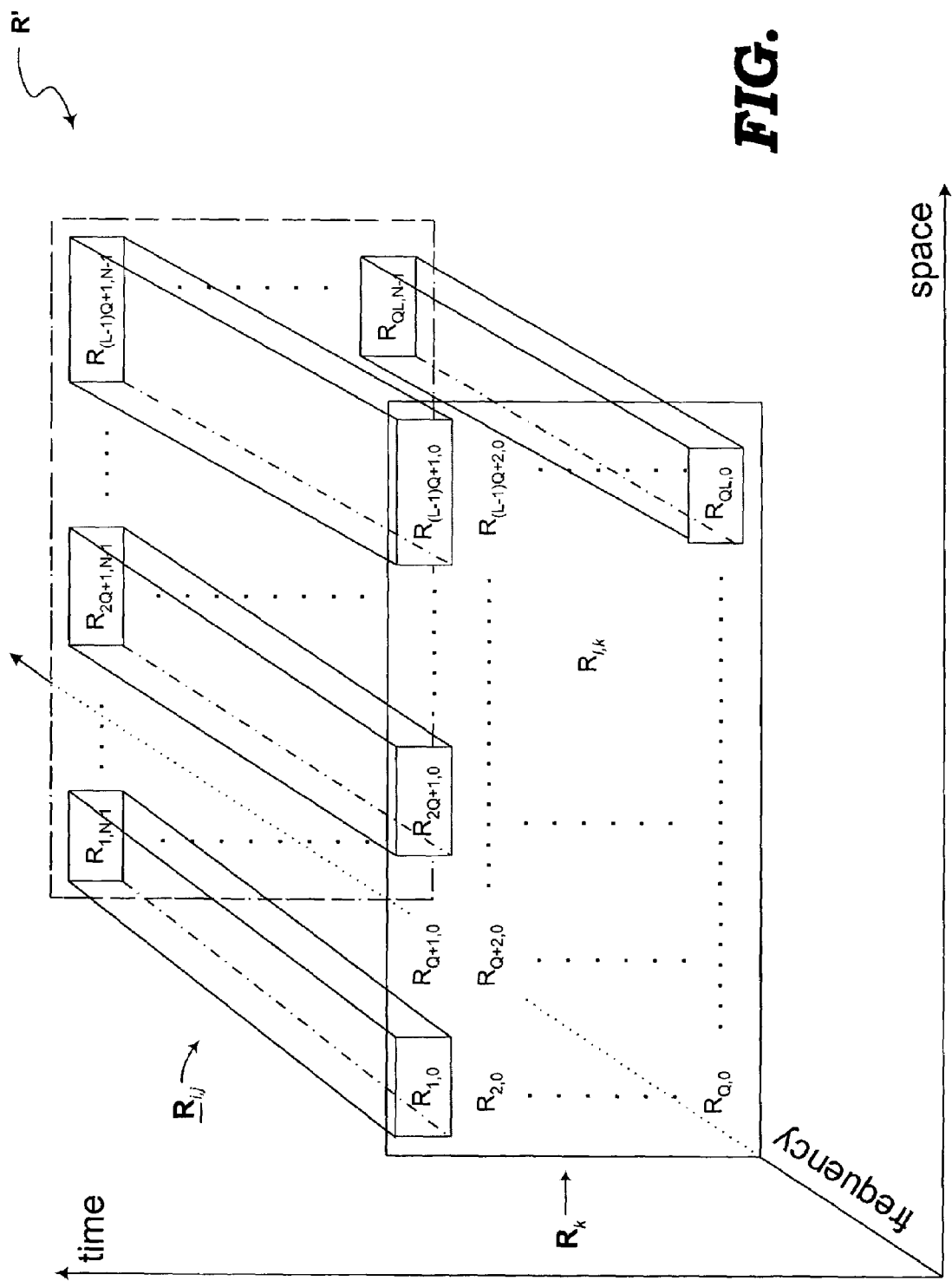
FIG. 5 is a three-dimensional graphical illustration of a version of the receive sample matrix shown in FIG. 4 that is applicable to the MIMO communication system of FIG. 1 when employing Orthogonal Frequency Division Multiplexing (OFDM).

FIG. 5 is a graphical illustration of a version of the receive sample matrix R' shown in FIG. 4 that is applicable to the MIMO communication system of FIG. 1, when employing OFDM. As shown, the x-axis represents space, the y-axis represents time, and the z-axis represents frequency. Each receive sample matrix $R_k$ that is depicted in the space-time dimensions is similar to the receive sample matrix R discussed above with respect to FIG. 4. However, each element of the receive sample matrix R' illustrated in FIG. 5 also has N frequency components that are each represented by an index, "k". As k varies from 0 to N−1 for the elements of each receive sample matrix $R_k$ in FIG. 5, the frequency component of the received symbol varies accordingly. Thus, the three-dimensional receive sample matrix R' can be viewed as including N receive sample matrices $R_k$ of dimensions Q×L or alternatively can be viewed as including (Q times L) vectors $R_{i,j}$ of length N. For example, with respect to the symbol received by the first antenna and demodulated by the first demodulator, there is a vector of elements $R_{1,0}$, $R_{1,1}$, ..., $R_{1,N-1}$, as depicted in FIG. 5.

Figure 6:
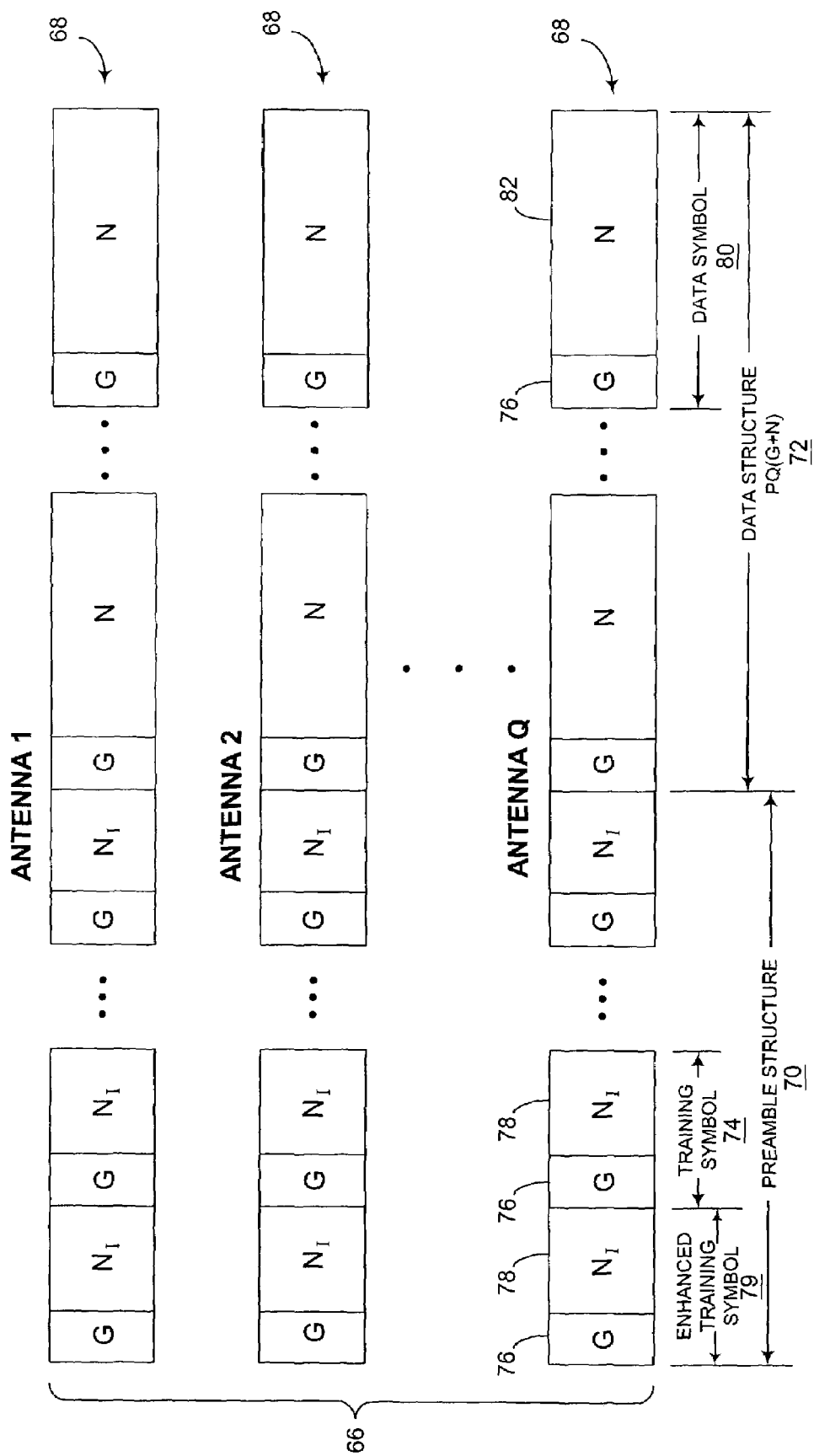
FIG. 6 illustrates exemplary data frames that may be implemented in the MIMO communication system depicted in FIG. 1.

FIG. 6 is a diagram illustrating an exemplary space-time signal structure 66 that may be implemented in a MIMO communication system that has Q transmit antennas, such as the MIMO communication system 10 depicted in FIG. 1. As depicted in FIG. 6, the space-time signal structure 66 typically includes Q frame structures 68. Each frame structure 68 corresponds to a respective TDB 22 and to a respective transmit antenna 26. Each frame structure 68 typically includes a preamble structure 70 and a data structure 72.

The training blocks of the preamble structure 70 are typically inserted into the frame structure 68 by the pilot/training symbol inserter 46. The preamble structure 70 typically includes one or more training symbols 74. Usually the number of training symbols 74 is equal to Q. Each training symbol 74 typically includes a cyclic prefix 76 of length G and a training block 78 of length $N_t$. The combination of a cyclic prefix 76 and a training block 78 forms the training symbol 74 that has a length of G+$N_I$ samples in the time domain. In addition, the preamble structure 70 contains one symbol referred to herein as an enhanced training symbol 79, located at the beginning of the preamble structure 70. The training block 78 of the enhanced training symbol 79 is divided into several sections. Certain sections are used for synchronization and other sections are used for channel parameter estimation, as will be discussed in more detail below. The sections typically have a length of N/4 or N/8, but other fractions of N may be used to form the sections of the enhanced training symbol 79. The length of each section of the enhanced training symbol 79 is given the value $N_J$, which is equal to N/J where J is an integer.

The cyclic prefix 76 may also be referred to as a guard interval, since the cyclic prefix 76 typically functions to guard the signal structures 68 from inter-symbol interference (ISI) during transmission of the space-time structure 66 across the channel 12. The time length $T_g$ of the cyclic prefix 76 having G samples is typically greater than the maximum time length of the channel impulse response $h_{i,j}$, which was discussed above for FIG. 4. In the example of an OFDM communication system in accordance with the present invention, the time length $T_g$ is about 25% of the time length of one OFDM symbol. However, depending on the time length of the channel 12, G may be less than 25% of one OFDM symbol.

As also depicted in FIG. 6, the data structure 72 typically includes one or more data symbols 80. Typically, the number of data symbols 80 is equal to a multiple of Q. Each data symbol 80 includes a cyclic prefix 76 and a data block 82. The cyclic prefix 76 may have a length G equal to the length of the cyclic prefix of the preamble structure. Alternatively, the length of the cyclic prefix of the data structure 72 may be different from the length of the cyclic prefix of the preamble structure 70. The data block 82 has a length N. The relationship between N and $N_I$ can be expressed by the equation $N_I$=N/I, where I is a positive integer.

The combination of a cyclic prefix 76 and a data block 82 forms the data symbol 80 that has a length of G+N samples in the time domain. Therefore, the data structure 72 of the frame structure 68 typically includes Q or more data symbols 80 that have an overall length of P*Q*(G+N) samples in the time domain, as depicted in FIG. 6, where P is some positive integer. Although omitted from FIG. 6 for simplicity, pilot symbols may also be intermittently inserted into the data symbols 80 by the pilot/training symbol inserter 46, as discussed above.

The time length $N_I$ of a training block 78 may be shorter than the length N of a data block 82 in a frame structure 68. Typically, the length $N_I$ of a training block 78 in the preamble structure 70 is established as a fraction of the length N of a data block 82 in the data structure 72 to provide the relationship of $N_I$ being equivalent to N/I, where I is a positive integer. For example, $N_I$ may be equivalent to N/4 (i.e., I=4). If the length $N_I$ of a training block 78 is not established in the communication system, the length $N_I$ may be assumed to be equivalent to N (i.e., I=1). Typically, the length of a training symbol 74 (i.e., G+$N_I$) in the prior art is equivalent to the length of a data symbol 80 (i.e., G+N). However, according to the present invention, the training symbol 74 may be shorter than the data symbol 80 in the context of the frame structure 68.

The enhanced training symbol 79 of length G+$N_I$ can be further subdivided into smaller sections for efficient synchronization and to perform frequency offset estimation over a wider range. The sequences contained in these sections are also known by the receiver 16. When the receiver 16 receives a space-time signal structure 66, the known sequence is compared with the enhanced training symbol 79 of the preamble structure 70 using a technique such as correlation, as is described in U.S. patent application Ser. No. 10/128,756, filed Apr. 24, 2002, which is incorporated by reference in it entirety herein.

The preamble structure 70 enables the receiver 16 (FIG. 1) to identify the arrival of the frame structure 68. Thus, the preamble structure 70 may facilitate time synchronization, frequency synchronization, channel parameter estimation, and noise variance estimation. Efficient preamble structures 70, in accordance with the present invention, provide the functions of time synchronization, frequency synchronization, channel parameter estimation, and noise variance estimation through synchronization signals that have low peak-to-average power ratios (PAPR) (e.g., at or approaching unity). These functions are achieved by the shortened preamble structures described herein, which are more efficient than the longer prior art structures. The range of frequency offset estimation can be improved with the shortened preamble structures. By subdividing the length of the training symbols in the time domain into integer multiples $N_J$, the range is increased.

A signal transmission matrix $S_k$ having an efficient preamble structure should be a unitary transmission matrix in the frequency domain and have a low PAPR in the time domain. In this regard, efficient preamble structures provide enhanced performance in a MIMO communication systems, requiring less overhead.

A unitary transmission matrix contains rows or columns that are orthogonal to each other, and the energy of the signals represented by each row or column is unity. In mathematical terms, a unitary transmission matrix has the properties represented by the following equations:

$$\sum_{j=1}^{Q} S_{i,j} S_{i',j}^* = \begin{cases} 1 & i = i' \\ 0 & i \neq i' \end{cases} \quad \text{EQ. 2A}$$

$$\sum_{i=1}^{Q} S_{i,j} S_{i,j'}^* = \begin{cases} 1 & j = j' \\ 0 & j \neq j' \end{cases} \quad \text{EQ. 2B}$$

where $S_{I,J}$ represents the constituent symbols of the unitary transmission matrix.

Providing a unitary signal transmission matrix $S_k$ reduces or eliminates noise enhancement during channel estimation of the received signals. Moreover, providing a unitary signal transmission matrix $S_k$ with an efficient preamble structure that possesses a low PAPR reduces or eliminates signal non-linearities and spurious out-of-band signal transmissions.

Furthermore, the enhanced training symbols of the transmitted signal is a short sequence that includes periodically repeating patterns with good correlation properties. The definition of a sequence having good correlation properties according to the present disclosure refers to any sequence having a unique pattern that is compared with a corresponding pattern of another sequence. For instance, using autocorrelation, when the pattern is matched in time with a corresponding pattern in the receiver 16, the patterns provide a peak output indicating a synchronization of the received signal.

Another advantage of the preamble structures described herein is that the shortened length of the preamble structures can be maintained for both SISO and MIMO communication systems. With a length of one OFDM symbol period, the preamble structures use far less bandwidth than used the prior art. The short preamble structures with short periodic sequences can be contained within one symbol period to allow for a greater amount of bandwidth available to transmit useful data or information.

Figure 7:
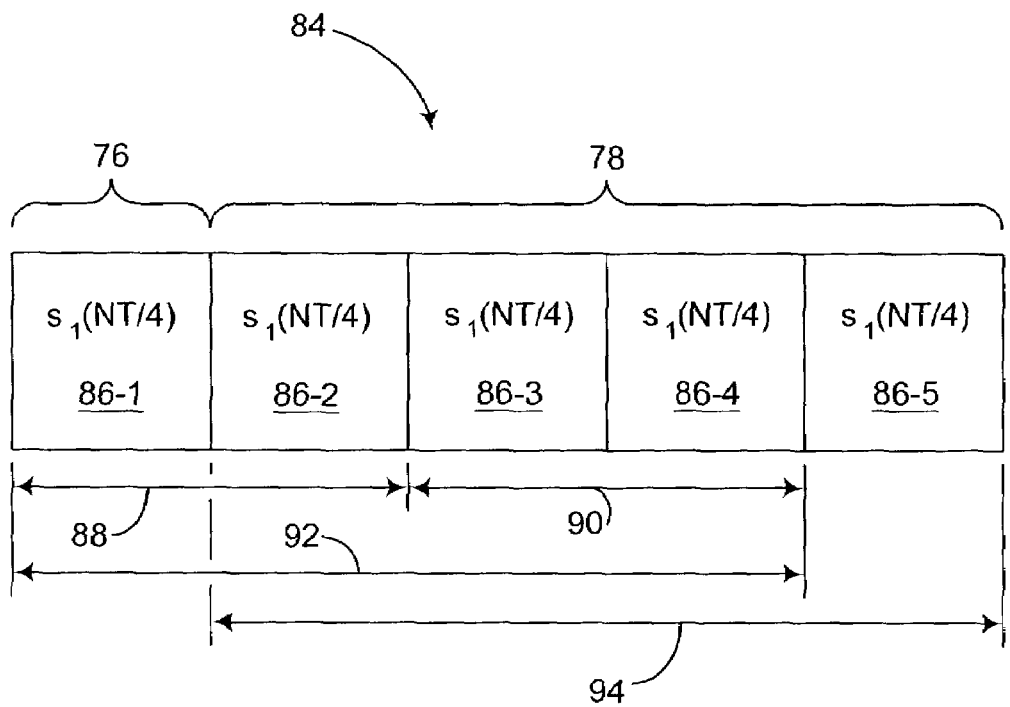
FIG. 7 illustrates an embodiment of a preamble structure that may-be implemented in a SISO communication system.
Figure 8:
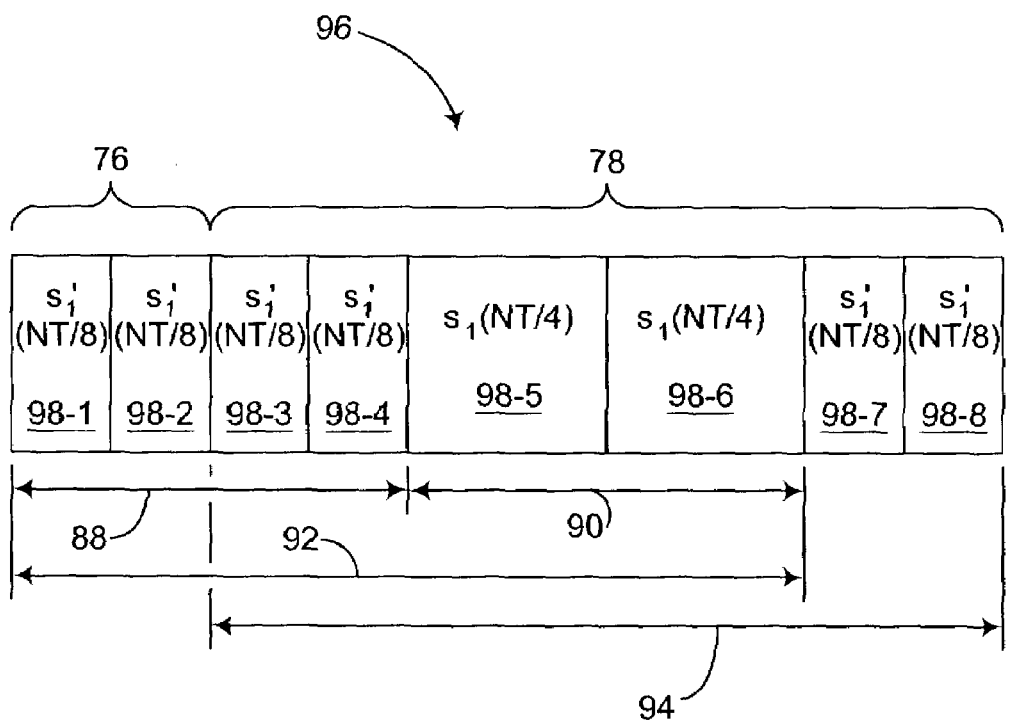
FIG. 8 illustrates another embodiment of a preamble structure that may be implemented in a SISO communication system.

In FIGS. 7-9, examples of enhanced training symbols 79 of the preamble structures are shown in accordance with the embodiments of the present invention. The enhanced training symbols 79 have a length of G+$N_I$ in the time domain, as explained above with respect to FIG. 6. The overhead for the enhanced training symbols 79 includes the cyclic prefix 76 having time length G. The length G is typically a fraction and is preferably equal to one divided by an integer. The length G, for example, may be one-fourth, or 25%, of the length of the training block 78. Furthermore, the time length $N_I$ of the training block 78 of the enhanced training symbol 79 is equal to the length of only one symbol period in an OFDM or other space-time communication system. With the shortened overhead of the enhanced training symbol 79, the efficiency of the communication system is improved in that the transmission of training symbols requires minimal bandwidth, thereby allowing a larger portion of the bandwidth for the transmission of data structures 72. Thus, more useful data or information can be communicated in the available bandwidth. Moreover, with the efficient preamble structures, time synchronization, frequency offset estimation, channel estimation, and noise variance estimation is accomplished.

FIG. 7 illustrates an example of an enhanced training symbol 84 for a SISO system that may be employed in a modulation/demodulation system, such as, for example, a SCFDE or OFDM system. The enhanced training symbol 84 includes five sections 86-1, 86-2, 86-3, 86-4, 86-5 each having length NT/4 in the time domain, where T is the sample time at the input to the DAC 58. The training block 78 of the enhanced training symbol 84 includes four sections 86-2, 86-3, 86-4, 86-5, and may be referred to as a 4×(NT/4) training symbol. For example, if N=256, then the training block 78 has 4×64T configuration. The entire length of the enhanced training symbol 84 is $T_s$. The length of the cyclic prefix 76 is $T_g$ and the length of the training block 78 is NT, as represented in interval 94. Cyclic prefix 76 has length G. In this example, G=NT/4. The sequence $S_1$ in frequency domain represents any sequence such that its modulation in the time domain $s_1$ has good correlation properties and low PAPR. For instance, the sequence $s_1$ may include a sequence formed using the exemplary modulator 24 shown in FIG. 3. In this example, each section 86 of the enhanced training symbol 84 is represented with the same type of sequence $s_1$.

A first interval 88 of the enhanced training symbol 84 spans the first two sections 86-1, 86-2. In this interval 88, the enhanced training symbol 84 includes sequences for performing time synchronization and coarse frequency offset estimation. These sequences may further be used for other functions. Coarse frequency offset estimation provides an estimation of the frequency offsets in a frequency range up to 4/NT. A second interval 90 begins at the start of the third section 86-3 and spans to the end of the fourth section 86-4 and includes sequences for providing parameter estimation, such as channel estimation and noise variance estimation. A third interval 92 spans the first four sections 86-1, 86-2, 86-3, 86-4. The portion of the enhanced training symbol 84 in the third interval 92 provides sequences for fine frequency offset estimation. Fine frequency offset estimation can be used to estimate the frequency offset up to a value of 1/NT. A fourth interval 94 spans over the entire training block 78. This length is preferably equal to NT, wherein NT refers to the time of the N samples of the N data block 82 shown in FIG. 6. The 4×NT/4 training block 78 of the enhanced training symbol 84 may be used in a MIMO communication system as well. In MIMO, this enhanced training symbol 84 may perform all the functions as expressed above or may alternatively perform synchronization only.

FIG. 8 is another exemplary embodiment of an enhanced training symbol 96 for a SISO system in a SCFDE, OFDM, or other type of modulation/demodulation system. The enhanced training symbol 96 comprises eight sections 98-1, 98-2, . . . , 98-8 in which the first four sections 98-1, 98-2, 98-3, 98-4 have sequences $s_1$' (NT/8) which are N/8-point IDFT of the sequence $S_1$' in the frequency domain. The first four sections are followed by two sections 98-5, 98-6 having sequences $s_1$ (NT/4) the N/4 point IDFTs of sequence $S_1$ which are further followed by two more sections 98-7, 98-8 of $s_1$' (NT/8) sequences. The cyclic prefix 76 (first two sections 98-1, 98-2) and the remaining six sections 98-3, 98-4, . . . , 98-8 (having length NT shown at the fourth interval 94) make up the enhanced training symbol 96. Again, G is equal to N/4. The sequence $S_1$' is any sequence in the frequency domain such that its N/8 point IDFT modulation in the time domain $s_1$' has good correlation properties and low PAPR. Again, a sequence with good correlation properties refers to having a unique periodically repeating pattern such that one portion of the repeating pattern is compared with another similar portion of the repeating pattern for determining an accurate starting of training symbols. The sequence $S_1$ is chosen such that its N/4 point IDFT in the time domain $s_1$ has good correlation properties and low PAPR.

In the embodiment shown in FIG. 8, the intervals 88, 90, 92, and 94 are substantially the same as the intervals shown in FIG. 7. However, it should be noted that the intervals are only shown for illustrated purposes and may be rearranged or extended if necessary. The first interval 88 of the enhanced training symbol 96 spans the first four $S_1$' sections 98-1, 98-2, 98-3, 98-4. In this interval 88, the enhanced training symbol 96 includes the sequences for performing time synchronization and coarse frequency offset estimation. Coarse frequency offset estimation provides a frequency offset estimation range up to 8/NT, which is a greater range than possible in the embodiment of FIG. 7. The second interval 90 begins at the start of the fifth section 98-5 and spans to the end of the sixth section 98-6. The second interval 90 includes sequences for providing parameter estimation, such as channel estimation and noise variance estimation. The third interval 92 spans the first six sections of the enhanced training symbol 96 providing sequences for fine frequency offset estimation. Fine frequency offset estimation in this embodiment can estimate the frequency offset up to 1/NT.

FIG. 9 illustrates an example of first and second enhanced training symbols 100 and 102 for a 2×2 MIMO system using OFDM or other type of modulation/demodulation system. A first antenna (ANTENNA 1) transmits the first enhanced training symbol 100. The first enhanced training symbol 100 has five sections 104-1, 104-2, . . . , 104-5 in which the $s_1$ sequence is included in the first, second, and fifth sections 104-1, 104-2, 104-5 where $s_1$ is the N/4 point IDFT of $S_1$. The third and fourth sections include a sequence ($-s_1$*) that is the IDFT of the N/4 point sequence $-S_1$* in the frequency domain. The sequence $-S_1$* is the negative of the complex conjugate of the sequence $S_1$ in the frequency domain. As is similar to the enhanced training symbol 84 shown in FIG. 7, the enhanced training symbol 100 includes five intervals each covering a NT/4 time period. The second antenna (ANTENNA 2) transmits the second enhanced training symbol 102, which includes the sequence $s_1$ in the first, second, and fifth sections 105-1, 105-2, 105-5 and the sequence $s_1^*$ in the third and fourth sections 105-3, 105-4. The sequence $s_1^*$ is the IDFT of the sequence $S_1^*$ in the frequency domain. The sequence $S_1^*$ is the complex conjugate of the sequence $S_1$.

In the example of FIG. 9 for use in a 2×2 MIMO communication system, time synchronization and coarse frequency offset estimation are performed using portions of the enhanced training symbols 100 and 102 within the interval 88. In this interval 88, coarse frequency offset is estimated up to a range of 4/NT. Parameter estimation is performed in a time interval 106 during the second, third, and fourth sections. Parameter estimation may include channel estimation, noise variance estimation, or both. Fine frequency offset estimation is performed using the sections of the enhanced training symbols 100 and 102 within interval 92 and can be estimated up to 1/NT.

A method of forming the enhanced training symbols in the time domain will now be described. The IDFT stage 52 includes a number of inputs $N_f$. Given that $N_f=N$ and $N=256$, then the following sequence $S_1$ may be input to the IDFT stage 52 to generate the enhanced training symbol 84:

$S_{1,256}$=sqrt(2)*{0000+1+j000-1-j000+1+j000+1-j000+1+j000+1+j000-1+j000+1+j000-1-j000+1+j000+1+j000+1-j000+1+j000+1+j000+1-j000-1-j000+1+j000-1-j000-1-j000+1+j000+1+j000+1-j000-1-j000-1+j000-1+j0 . . . 0(55 0's)+1+j000+1+j000+1+j000-1+j000+1+j000-1-j000+1-j000-1-j000-1-j000+1+j000-1+j000+1+j000-1-j000+1-j000+1+j000+1+j000+1-j000-1-j000+1-j000+1+j000-1-j000+1-j000+1+j000-1+j000+1-j000}

As can be seen from this example, every fourth sub-carrier of the IDFT input is excited whereas all the other inputs are set to zero. The output of IDFT will be an N-point sequence with a periodicity of N/4. A cyclic prefix is inserted in front of the sequence to form complete the enhanced training symbol.

Another method for generating the enhanced training symbol shown in FIG. 7. is to have $N_f=N/4$. Given that $N=256$, a sequence $S_I$ such as the one shown below is input to the IDFT stage 52 to generate the enhanced training symbol:

$S_{1,64}$={11-11-11-11-111-111-1-1-1-1111-11-1-110000000000000-11111-1111-1-111-11-1-11-11-1-1-11-1}

The output of the IDFT is an N/4 point sequence which is repeated 4 times and a cyclic prefix is added to generate the enhanced training symbol having the form CP (cyclic prefix)+4×64. In a similar manner, all the other training symbols can be generated by generating the constituent subsections and then combining them together.

The enhanced training symbol shown in FIG. 7 may be further modified to be used in the MIMO system such that the different sequences from different antennas are orthogonal to each other. This orthogonality is achieved by keeping the constituents of the sequence $S_I$ the same but altering the sub-carriers. For example, the sequence transmitted from antenna 1 has only its even sub-carriers excited as shown:

$S_{1,256, \text{ antenna } 1}$=sqrt(2)*{0000+1+j000-1-j000+1+j000+1-j000+1+j000+1+j000-1+j000+1+j000-1-j000+1+j000+1+j000+1-j000-1-j000+1+j000-1-j000-1-j000+1+j000+1+j000+1-j000-1-j000-1+j000-1+j0 . . . 0(55 0's)+1+j000+1+j000+1+j000-1+j000+1+j000-1-j000-1-j000-1-j000+1+j000-1+j000+1+j000-1-j000+1-j000+1+j000+1+j000-1-j000+1-j000+1-j000}

The sequence used for antenna 2 is the same as the one used for antenna 1 except that its odd sub-carriers are excited as shown:

$S_{1,256, \text{ antenna } 2}$=sqrt(2)*{000+1+j000-1-j000+1+j000+1-j000+1+j000+1+j000-1+j000+1+j000+1+j000-1-j000+1+j000+1-j000+1+j000+1+j000-1-j000+1+j000-1-j000-1+j000+1+j000+1+j000-1-j000-1-j000-1+j000-1+j0 . . . 0(55 0's)+1+j000+1+j000+1+j000-1+j000+1+j000-1-j000-1-j000-1+j000-1+j000+1-j000-1-j000+1+j000+1-j000+1+j000-1-j000-1-j000+1-j000+1+j0000}

Thus, with the use of the enhanced training symbols 84 and 96 in a SISO communication system, the synchronization can be enhanced and the system throughput may be increased. Likewise, the use of the enhanced training symbols 100 and 102 in a MIMO communication system also provides enhanced synchronization and hence increased system throughput. These enhanced training symbols provide for more hierarchical frame structures in communication systems.

It is noted that embodiments of the present invention, such as those described above, may be implemented in hardware, software, firmware, or a combination thereof. For example, in some embodiments, the present invention may be implemented as a computer program or application in software or firmware that is stored in a memory and that is executed by a suitable instruction execution system. In other embodiments the present invention may be implemented, for example, with one or a combination of the following technologies, which may be known in the art: one or more discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Finally, it should be emphasized that the above-described embodiments of the present invention are merely possible examples of implementations set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the invention, and protected by the following claims.

We claim:

1. A transmitter of a communication system, the transmitter comprising:

an encoder having a pilot/training symbol inserter, the pilot/training symbol inserter configured to insert pilot symbols into data blocks and to combine training symbols with the data blocks;

at least one modulator, each modulator having an inverse discrete Fourier transform (TDFT) stage and a cyclic prefix inserter, each modulator outputting a frame structure comprising a preamble structure and a data structure, the preamble structure comprising at least one training symbol and an enhanced training symbol; and at least one transmit antenna, each transmit antenna corresponding to a respective one or the at least one modulator, each transmit antenna transmitting the frame structure output from the corresponding modulator, wherein the enhanced training symbol is a single symbol.

2. The transmitter of claim 1, wherein the data structure comprises a plurality of data symbols, each data symbol having a data block and a cyclic prefix, the cyclic prefix being inserted by the cyclic prefix inserter, and each of the at least one training symbol comprises a cyclic prefix and a training block the cyclic prefix being inserted by the cyclic prefix inserter, the training block being inserted by the pilot/training symbol inserter.

3. The transmitter of claim 2 wherein the enhanced training symbol comprises a cyclic prefix and a training block, the cyclic prefix being inserted by the cyclic prefix inserter, the training block inserted by the pilot/training symbol inserter.

4. The transmitter of claim 3, wherein each data block has a number of samples N, each training block of the at lease one training symbol has a number of samples $N_T$, and the training block of the enhanced symbol has a number of samples $N_T$, whereby $N_T=N/I$, where I is an integer.

5. The transmitter of claim 3, wherein the training block of the enhanced training symbol is divided into a number of sections having a number of samples $N_J$ such the $N_T=N/J$, where J is an integer.

6. The transmitter of claim 5, wherein J equals 4.

7. The transmitter of claim 3, wherein the cyclic prefixes have a number of samples such that G=N/I, where I is art integer.

8. The transmitter of claim 1, wherein the enhanced training symbol comprises a cyclic prefix and a training block, the cyclic prefix having a number of samples G, the training block having a number of samples $N_T$, whereby $N_T=N/I$, where N is equal to the number of samples of data blocks of the data structure and I is an integer, and whereby G $N_T/4$.

9. The transmitter of claim 8, wherein the training block is divided into four sections, each section having a number of samples $N_T/4$.

10. The transmitter of claim 9, wherein the cyclic prefix and each of the four sections comprises the same sequence.

11. The transmitter of claim 10, wherein the cyclic prefix and the first section provide time synchronization and coarse frequency offset estimation, the second and third sections provide channel estimation and noise variance estimation, and the cyclic prefix and first, second, and third sections further provide fine frequency offset estimation.

12. The transmitter of claim 11, wherein the communication system is a single-input, single-output (SISO) communication system.

13. The transmitter of claim 8, wherein the cyclic prefix is divided into first and second sections having a number of samples $N_T/8$, the training block is divided into third, fourth, fifth, sixth, seventh, and eighth sections, the third, fourth, seventh, and eighth sections having a number of samples $N_T/8$, the fifth and sixth sections having a number of samples $N_T/4$.

14. The transmitter of claim 13, wherein the first, second, third, fourth, seventh, and eight sections comprise a first sequence, and the fifth and sixth sections comprise a second sequence.

15. The transmitter of claim 14, wherein the first, second, third, and fourth sections provide time synchronization and coarse frequency offset estimation, the fifth and sixth sections provide channel estimation and noise variance estimation, and the first through sixth sections further provide fine frequency offset estimation.

16. The transmitter of claim 15, wherein the communication system is a single-input, single-output (SISO) communication system.

17. The transmitter of claim 8, wherein the number of modulators and transmit antennas is two, a first training block corresponding to a first transmit antenna being divided into four sections, each section having a number of samples $N_T/4$, and a second training block corresponding to a second transmit antenna being divided into four sections, each section having a number of samples $N_T/4$.

18. The transmitter of claim 17, wherein the cyclic prefixes of each transmit antenna and the first and fourth sections of the first and second training blocks comprise a first, sequence, the second and third sections of the first training block comprising a second sequence that is the negative of the complex conjugate of the first sequence, and the second and third sections of the second training block comprising a third sequence that is the complex conjugate of the first sequence.

19. The transmitter of claim 18, wherein the cyclic prefixes and first sections of the first and second training blocks providing time synchronization and coarse frequency offset estimation, the first, second, and third sections of the first and second training blocks providing channel estimation and noise variance estimation, and the cyclic prefixes and first, second, and third sections of the first and second training blocks further providing fine frequency offset estimation.

20. A method of forming a frame structure that is transmitted in a communication system, the method comprising the steps of:
providing data blocks;
providing training blocks;
combining the data blocks and training blocks in a parallel format to provide a parallel combination;
taking an inverse discrete fourier transform (IDFT) of the parallel combination to form IDFT blocks;
inserting the cyclic prefixes between the IDFT blocks to form parallel symbols;
converting the parallel symbols to serial format to form a preamble structure and a data structure, the preamble structure comprising at least one training symbol and an enhanced training symbol; the data structure comprising a plurality of data symbols;
forming data symbols such that each data symbol comprises a cyclic prefix and a data block, the cyclic prefix having a number of samples G, the data block having a number of samples N; and
forming a preamble structure having an enhanced training symbol, the enhanced training symbol comprising a cyclic prefix and a training block, the cyclic prefix having a number of samples G, the training block having a number of samples $N_T$ such that $N_T=N/I$, where I is an integer and $G=N_T/4$.

21. The method of claim 20, wherein the step of taking an IDFT comprises receiving an input to an IDFT stage such that the enhanced training symbol is formed having five sections, each section having the same sequence.

22. The method of claim 20, wherein the step of taking an IDFT comprises receiving an input to an IDFT stage such that the enhanced training symbol is formed having eight sections, each of the first, second, third, fourth, seventh, and eight sections comprising a first sequence, each of the fifth and sixth sections having a second sequence.

23. The method of claim 20, wherein the step of combining further comprises dividing the data blocks and training blocks onto two transmit diversity brances (TDBs), and forming a frame structure further comprises forming two frame structures, each frame structure being formed on a respective TB.

24. The method of claim 23, wherein a first enhanced training symbol on a first TDB is formed having five sections, and a second enhanced training symbol on a second TDB is formed having five sections.

25. The method of claim 24, wherein the first, second, and fifth sections of each of the first and second enhanced training symbols are formed such that each comprises a first sequence, the third and fourth sections of the first enhanced training symbol are formed such that each comprises a second sequence that is the negative of a complex conjugate of the first sequence, and the third and fourth sections of the second enhanced training symbol are formed such that each comprises a third sequence that is the complex conjugate of the first sequence.

* * * * *